Dec. 20, 1960 H. W. CHRISTENSON 2,965,202
TRANSMISSION
Filed Dec. 19, 1955 2 Sheets-Sheet 1
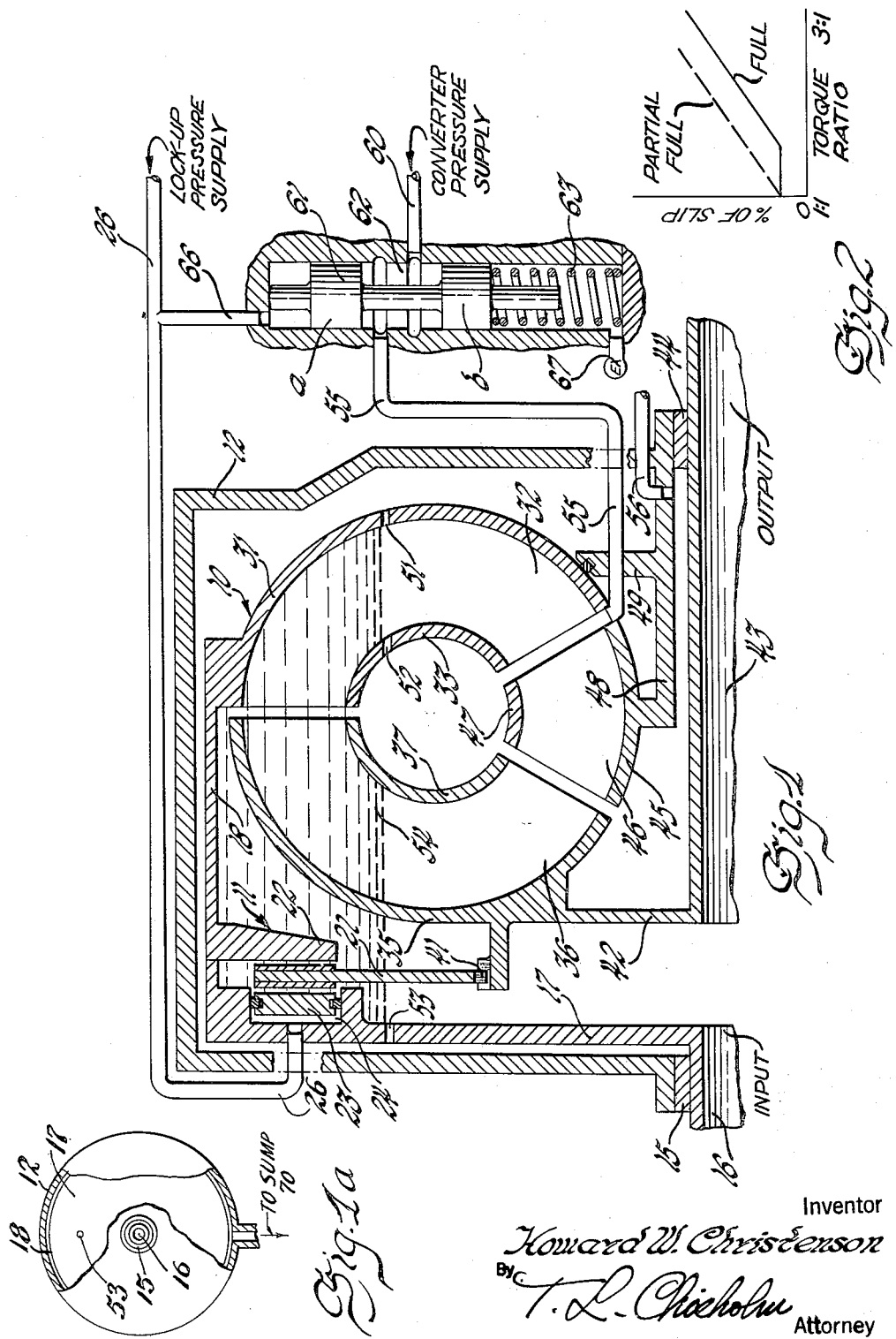
Inventor
Howard W. Christenson
By T. L. Chisholm
Attorney Dec. 20, 1960 H. W. CHRISTENSON 2,965,202
TRANSMISSION
Filed Dec. 19, 1955 2 Sheets-Sheet 2

INVENTOR
Howard W. Christenson
BY
T. L. Chisholm
ATTORNEY

2,965,202

TRANSMISSION

Howard W. Christenson, Indianapolis, Ind., assignor to General Motors Corporation, Detroit, Mich., a corporation of Delaware Filed Dec. 19, 1955, Ser. No. 553,949

12 Claims. (Cl. 192—3.2)

This invention relates to a transmission having a hydrokinetic torque converter, a lockup clutch and an automatic control system and more particularly to a torque converter and a control system therefor.

This invention is an improvement in automatic transmissions of the type having a hydrokinetic torque converter, a lockup clutch and a multiratio gear unit. The engine is connected through the converter to the gear unit until the lockup clutch is engaged to provide a direct drive from the engine to the gear unit. The hydraulic control system for these transmissions employs an automatically controlled lockup shift valve to engage the lockup clutch when the vehicle is accelerated in the first or other starting gear ratio. Then as the gear unit is shifted to higher ratios by the control system the lockup clutch is disengaged by a lockup cut-off valve during each shift interval in response to each change of ratio in the multiratio gear unit. However in many transmissions of this type, the torque converter will be operating in the coupling range where the converter is tight or has low slip and will not adequately cushion the shift. In accordance with the present invention the interrupted lockup pressure is employed whenever the lockup clutch is engaged to close a valve and discontinue the supply of fluid to the converter chamber. The converter has a bleed opening in the shell to permit a portion of the fluid to drain from the torque converter chamber so that the torque converter will provide, during subsequent shift intervals when the lockup clutch is disengaged, a soft or higher slip connection to soften the shift.

An object of the invention is to provide in a torque converter chamber with a bleed opening which is insufficient to partially empty the torque converter when it is being fully supplied with fluid but which is sufficient to drain a portion of the fluid from the torque converter when the supply is reduced or discontinued.

Another object of the invention is to provide in a hydrokinetic torque converter of the above type having a lockup clutch, a hydraulic control system to engage the lockup clutch and to discontinue the supply of fluid to the converter chamber.

Another object of the invention is to provide in a hydrokinetic torque converter and lockup clutch, a converter chamber having a drain passage which continuously drains fluid from the converter chamber, a normal supply for the converter when the lockup clutch is disengaged sufficient to fill the converter and a control responsive to the engagement of the lockup clutch to discontinue the supply to the converter sufficiently to permit the drain to partially empty the converter chamber.

Another object of the invention is to provide in a transmission having a hydrokinetic torque converter, a lockup clutch and a multiratio gear unit, a converter chamber having a drain passage which continuously drains fluid from the converter chamber, a normal supply for the converter when the lockup clutch is disengaged sufficient to fill the converter and a control responsive to a change in ratio in the gear unit to discontinue the supply to the converter enough to permit the drain to partially empty the converter chamber.

Another object of the invention is to provide in a transmission having hydrokinetic torque converter and a lockup clutch, a converter chamber having a drain passage which continuously drains fluid from the converter chamber, a normal supply for the converter when the lockup clutch is disengaged sufficient to fill the converter and a control responsive to a change in a condition of said transmission to discontinue the supply to the converter to permit the drain to partially empty the converter chamber.

These and other objects of the invention will become apparent from the following detailed description of a preferred embodiment shown in the accompanying drawings, in which:

Fig. 1 is a diagrammatic view of a torque converter and lockup clutch of a transmission and the controls therefor.

Fig. 1a is a front end view of Figure 1.

Fig. 2 shows slip curves for a full and partially full converter.

Figure 3:
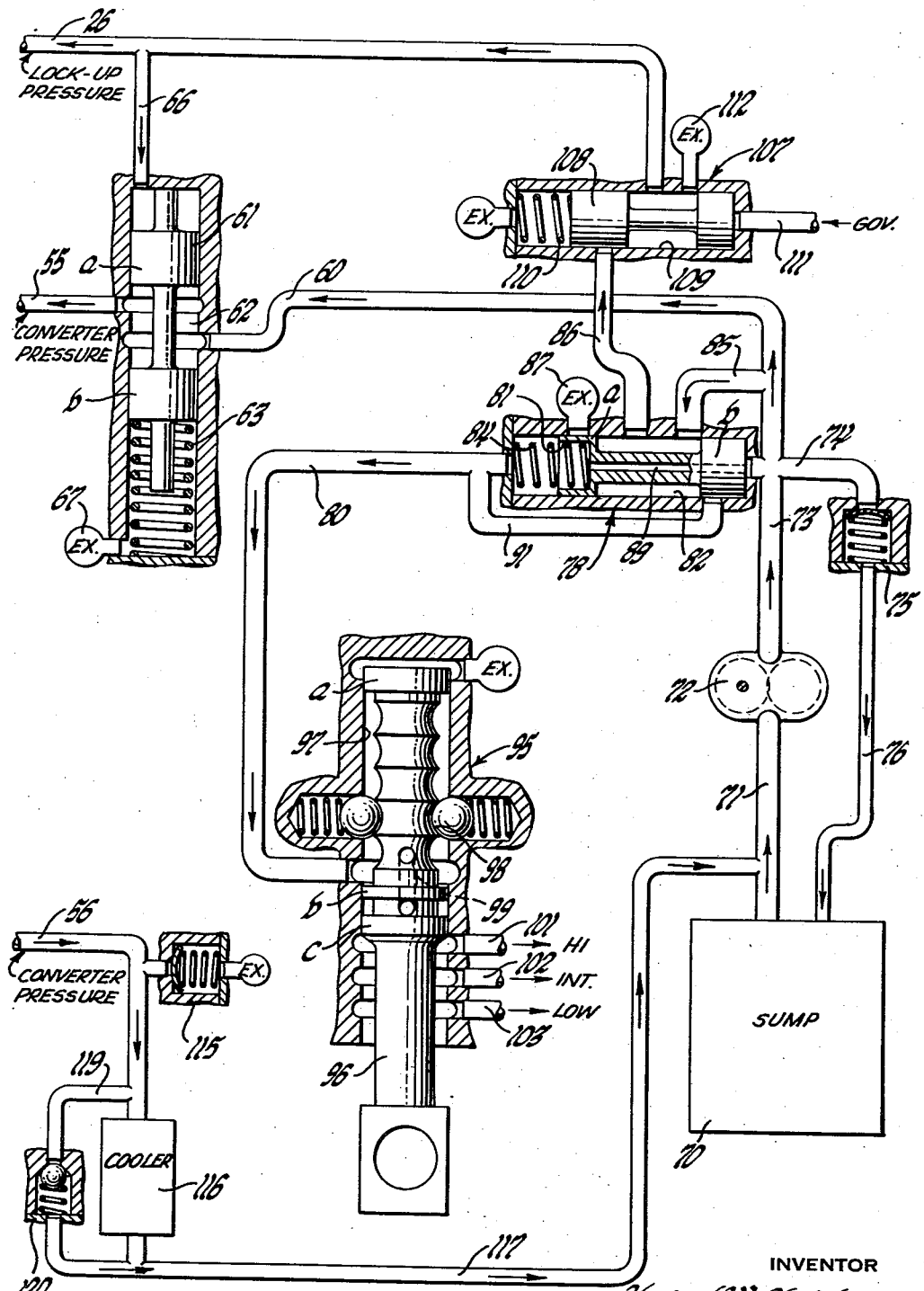

Fig. 3 schematically shows the control system.

The hydrokinetic torque converter 10 and lockup clutch 11 as shown diagrammatically in Fig. 1 are located in the conventional stationary transmission casing 12. A bearing 15 in the forward wall of housing 12 rotatably supports the input shaft 16 which is connected to the forward wall 17 of the rotary torque converter housing 18. The driven plate 21 of the lockup clutch 11 is located between the fixed abutment 22 on housing 18 and the annular actuating piston 23 located in the cylinder 24 formed in the forward wall 17. The lockup pressure line 26 is connected to the cylinder 24 to supply pressure to move the piston 23 to engage the lockup clutch to provide a direct drive from the input shaft 16 and the forward wall 17 to the clutch driven plate 21. Though line 26 is shown diagrammatically connected to cylinder 24 it will be appreciated that this represents conventional structure, such as a transfer bushing to shaft 16 and a passage in wall 17.

The converter housing 18 has an impeller shell 31 supporting the impeller blades 32 and the inner shroud 33. The turbine shell 35 supports the turbine blades 36 and the turbine shroud 37. Turbine shell 35 is connected by splines 41 to the clutch driven plate 21 and by the hub 42 to the output shaft 43 which is rotatably supported in a bearing 44 in the rear portion of the housing. The stator shell 45 supports the stator blades 46 and the stator shroud 47 and is mounted either directly or by means of a one-way clutch (not shown) on the ground sleeve 48 which is fixed to the transmission casing 12. The ground sleeve 48 has an annular sealing wall 49 to separate the wet housing 12 from the impeller housing 18.

The impeller shell 31 is provided with a drain port 51, impeller shroud 33 with drain port 52, and the impeller housing 18 with port 53. The ports 51 and 53 permit direct drainage from the converter chamber to the sump in the lower half of housing 12 (shown in Fig. 1a). The port 52 provides communication between the core and annular torus chamber of the converter. Though one of ports 51 and 53 is sufficient, quicker leveling of the fluid is obtained when both are used. These drain openings are about one-third the radial distance from the outer perimeter to the inner perimeter of the torque converter torus chamber and thus will permit about two-thirds of the fluid to drain from the torque converter chamber when the torque converter supply is discontinued during the time that the torque converter is inoperative and the lockup clutch is engaged.

The converter chamber is the torus shaped chamber between the shells and shrouds of the converter elements and containing the impeller, turbine and stator blades. Fluid is supplied to the torque converter chamber by inlet line 55 diagrammatically representing a conventional construction such as a passage in stationary ground sleeve 48. The line 55 is connected at the point between the stator and the impeller. Fluid leaves the torque converter chamber at the point between the stator and the pump and is exhausted from the transmission housing via outlet line 56. When the torque converter chamber is full the converter operates in the conventional manner. The impeller circulates the fluid through the turbine 35 and stator 45 to provide a variable torque ratio drive of the turbine. When the converter chamber is full the percent of slip is low especially as the torque ratio approaches 1:1 as indicated by the solid curve in Fig. 2 to provide a tight converter. When the converter chamber is only partially full the percent of slip is higher as indicated by the dotted line curve in Fig. 2 to provide a soft converter. It is important that the slip is increased at torque ratios approaching the 1:1 torque ratio so the converter provides more slip to cushion engagement and disengagement of the lockup clutch 11 and the ratio changes in a transmission employed with this torque converter.

A suitable source of fluid at a regulated pressure and controlled by manual and/or automatic valves is provided by the converter supply line 60. The lockup supply line 26 provides pressure to engage the lockup clutch 11 at a pressure regulated by a suitable pressure regulator valve and controlled or interrupted by a manual and/or automatic control valves. A specific example of a suitable hydraulic control system providing an interrupted lockup supply line and a controlled converter supply line is shown in Fig. 3. The converter control valve 61 has lands a and b of equal diameter located in the closed bore 62 in a valve body. A spring 63 engages the wall closing one end of bore 62 and land b to normally urge valve 61 to an open position connecting converter supply line 60 between the lands a and b to inlet line 55. When the lockup fluid is supplied to engage the lockup clutch 11, branch line 66 conveys the fluid to the upper end of the bore 62 to move the valve 61 down, compressing the spring 63, to block the line 55. The converter supply is thus cut off from the converter inlet line 55. The spring chamber portion of bore 62 is provided with a vent 67 to prevent trapping of oil in the spring chamber.

When the lockup pressure line 26 is exhausted and the lockup clutch 11 is disengaged the converter is supplied with fluid from the converter pressure line 60 to the converter supply line 55 to fill the converter. Flow through the line 55 is great enough so that the leakage through the drain ports 51 and 52 will not prevent filling the converter chamber. The converter drive then provides normal torque multiplication with low slip. When the lockup pressure is applied to engage the lockup clutch, the valve 61 is closed to block the converter supply. Thus during the period of operation with the lockup clutch engaged, the flow to the torque converter is either fully or partially discontinued or disabled so that the torque converter will be emptied through the drain ports 51 and 52 until it is approximately one-third full. The partially filled converter, which is not transmitting torque when the lockup clutch is engaged, is thus conditioned to deliver cushioned high slip torque when the lockup clutch is disengaged, for example, during a gear ratio change.

As a transmission, provided with a control system as disclosed in Fig. 3, is started, the converter is supplied by supply line 60, valve 61 and inlet line 55 to fill the chamber to provide a converter drive with low slip. When the converter approaches a 1:1 ratio or coupling stage, the lockup supply line 26 supplies fluid to engage lockup clutch 11 and close the control valve 61 to discontinue the supply of fluid to the converter. Then the fluid in the converter drains through ports 51 and 52 to provide a partially full converter as indicated by the fluid level line 54. Thereafter whenever a ratio change is made in the multiratio gear unit, the lockup clutch is disengaged and the drive is transmitted through the partially full converter to cushion the ratio change and re-engagement of the lockup clutch. Though the converter is being filled during the ratio change, the rate of fill is not sufficient to completely fill the converter chamber before the ratio change is completed. Then after a short time interval the lockup clutch is re-engaged.

This torque converter may be employed with a multiratio transmission having the hydraulic controls shown in Fig. 3. The sump or bottom portion of the housing 12 for both the torque converter and the gearing, though not shown in Fig. 1, is diagrammatically shown at 70 in Fig. 3. The fluid exhausting from ports 51 and 53 in the torque converter passes around the ground sleeve 48 and the input shaft 16, respectively, to the lower portion of the housing 12 which is similar to the upper portion and is connected to or is part of the sump 70. Similarly, the control system exhausts, such as exhaust 67, and the lubrication exhaust return to sump 70 in a conventional manner. This system is supplied with fluid from the sump 70 which is connected by line 71 to pump 72. Fluid is delivered by the pump 72 to the main line 73 which has a branch 74 connected to pressure relief valve 75 which returns excess fluid via line 76 to sump 70. A lockup cut-off valve unit 78 connects the main line 73 to the ratio change line 80. The lockup cut-off valve member 81 has equal spaced lands a and b in the bore 82. A spring 84 holds the valve in the open position connecting the main line branch 85 between the lands a and b to the lockup feed line 86 and closing exhaust port 87. When a ratio change is made, flow from main line 74 enters the right ends of the bore 82, passes through the axial restricted passage 89 in the valve 81 to the other end of the bore to the ratio change line 80. The flow through the restricted passage 89 will provide a pressure differential moving the valve 81 toward the closed position. The flow of oil from main line through branch 85 to the lockup line 86 is blocked by land b and lockup line 86 is connected between lands a and b to exhaust 87. Further full opening movement of valve 81 will open by-pass 91 to directly connect main line 73 to ratio change line 80 to limit the pressure differential.

The ratio of the transmission is controlled by the manual valve unit 95 which consists of a valve member 96 having equal lands a, b and c located in bore 97. A detent mechanism 98 consisting of cooperating grooves on the valve 96 and spring-loaded detent balls positions the valve in each ratio position. In all positions of valve movement ratio change line 80 is connected to valve bore 97 between lands a and b and connected by a passage 99 to the space between the lands b and c. In the neutral position shown, the fluid is blocked at this point. On successive movement to the high, intermediate and low positions, the valve unit 95 connects line 80 to the high clutch line 101, the intermediate clutch line 102 or the low clutch line 103. These lines are connected respectively to conventional fluid operated ratio engaging devices of the transmission indicated for high ratio "Hi," for intermediate ratio "Int" and for low ratio "Low" in Fig. 3.

The lockup feed line 86 is controlled by the lockup shift valve unit 107 which consists of a spool-type valve member 108 located in a bore 109. The valve is urged to the closed position by a spring 110 and toward the open position by a governor pressure in line 111 connected to the other end of the bore 109. In the closed position illustrated, the lockup feed line 86 is blocked by one land and the lockup clutch line 26 connected to exhaust 112. When the governor pressure moves the valve to the open position, exhaust 112 is blocked and lockup feed line 86 is connected between the lands to the lockup clutch line 26 to engage the lockup clutch. The main line 73 is connected to the converter feed line 60 when the lockup clutch is disengaged as shown through the valve 61 to the converter inlet line 55 and blocked when the lockup clutch is engaged to permit partial emptying of the converter. The pressure in the converter outlet line 56 is controlled by regulator valve 115 and passes through a cooler 116 to return line 117 which returns the oil to line 71. If the cooler 116 is blocked for example by cold oil, the converter outlet line 56 is connected through the by-pass line 119 and the by-pass valve 120 to return line 117.

The above-described embodiment is illustrative of the invention which may be employed in modified forms within the scope of the appended claims.

I claim:

1. In a transmission, drive means including a hydrokinetic torque converter having input and output bladed members and a fluid chamber for said bladed members and a fluid actuated clutch connecting said input and output members, said torque converter chamber having drain means operative during torque converter operation only when a large volume of fluid is in said chamber to slowly drain fluid from said chamber and operative only when a small voume of fluid is in said chamber to prevent drainage to retain a small volume of fluid in said chamber to provide a high slip converter drive, a clutch supply line for supplying fluid to actuate said clutch, a converter supply line to supply fluid to said chamber to fill said chamber though a portion of the fluid passes through said drain means to provide a low slip converter drive, and fluid control means to control the supply of fluid to said chamber, and clutch control means to engage and disengage said clutch and to control said fluid control means to discontinue the supply of fluid to said chamber when said clutch is engaged to permit said drain means to reduce the volume of fluid in said chamber from said large volume to said small volume to provide a high slip converter drive for use when said clutch is disengaged and to fill said chamber at a predetermined rate when said clutch is disengaged to gradually provide a low slip converter drive.

2. In a transmission, an input and output member, drive means including a fluid drive connecting said members and having bladed elements in a fluid chamber and a clutch connecting said members, said fluid drive including supply and drain means operatively connected to said chamber and operative during fluid drive operation under a first control condition to maintain a large volume of fluid in said chamber substantially filling said chamber to provide a low slip fluid drive and under a second control condition to maintain a small volume of fluid in said chamber only partially filling said chamber to provide a high slip fluid drive. clutch control means for engaging and disengaging said clutch, a supply line to supply fluid to said supply and drain means for said chamber to fill said chamber when said supply and drain means is operating in said first control condition to provide a low slip fluid drive, and means connecting said clutch control means to control said supply and drain means to position said supply and drain means in said second control condition when said clutch is engaged to permit said supply and drain means to partially empty and maintain said small volume of fluid in said chamber to provide a high slip fluid drive for use when said clutch is disengaged and to position said supply and drain means in said first control condition when said clutch is disengaged to maintain said chamber substantially full to provide a low slip fluid drive.

3. In a transmission, a fluid drive having bladed elements in a chamber for fluid, said chamber having drain means to continuously evacuate fluid at a low volume flow rate from the fluid chamber and being arranged to retain a predetermined volume of fluid in said chamber to provide a high slip fluid drive, and a controlled supply line to supply fluid at a higher volume flow rate at times to said fluid chamber to fill said chamber though a portion of the fluid passes through said drain means to provide a low slip fluid drive.

4. In a fluid drive having bladed members located in a fluid chamber, said fluid chamber having a central exhaust, said chamber having drain means connected to said chamber at a point intermediate said central exhaust and the outer diameter of said chamber operative during operation of said fluid drive to evacuate fluid at a low volume flow rate from the fluid chamber when more than a predetermined volume of fluid is in said chamber and retaining means operative at all times during operation of said fluid drive to retain a predetermined volume of fluid less than the volume of said chamber in said chamber to provide a high slip fluid drive, a fluid drive supply line to supply fluid at a larger volume flow rate to said fluid chamber to fill said chamber, a portion of the fluid passing through said drain means and the excess through said exhaust, and control means to discontinue said supply of fluid to said fluid chamber to permit said drain means to partially empty said chamber to provide said high slip fluid drive.

5. In a fluid drive having bladed members located in a fluid chamber, said chamber including drain means operative during operation of said fluid drive only when a high volume of fluid is in said chamber to evacuate fluid at a low flow rate from the fluid chamber and retaining means operative at all times during operation of said fluid drive to retain a predetermined small volume of fluid in said chamber to provide a high slip fluid drive, a fluid drive supply line to supply fluid to said fluid chamber to fill said chamber, a portion of the fluid passing through said drain means, and control means to discontinue said supply of fluid to said fluid chamber to permit said drain means to partially empty said chamber to provide said high slip fluid drive.

6. In a fluid drive having bladed members located in a fluid chamber, said chamber having drain means connected to said chamber continuously operative only when a high volume of fluid is in said chamber to evacuate fluid from the fluid chamber and retaining means including said chamber and drain means operative at all times to retain a predetermined small volume of fluid in said chamber to provide a high slip fluid drive, a fluid drive supply line to supply fluid at a rate to said fluid chamber to fill said chamber though a portion of the fluid passes through said drain means, and control means to discontinue said supply of fluid to said fluid chamber to permit said drain means to partially empty said chamber to provide said high slip fluid drive.

7. In a transmission, drive means including a fluid drive having bladed input and output members in a fluid chamber having a wall, a lockup clutch connecting said input and output members, said chamber having a central exhaust and drain means operative only when a high volume of fluid is in said chamber to exhaust fluid at a low volume flow rate from the fluid chamber and retaining means to retain a predetermined volume of fluid in said chamber to provide a high slip fluid drive, a controlled supply line for supplying fluid to actuate said lockup clutch, a fluid drive supply line to continuously supply a larger volume of fluid to said fluid chamber though a portion of the fluid passes through said drain means with the excess passing to the exhaust, and control means responsive to a change in condition of said lockup clutch to discontinue the supply of fluid to said fluid chamber to permit said drain means to partially empty said chamber to provide said high slip fluid drive when said lockup clutch is engaged.

8. In a transmission, drive means including a fluid drive having bladed input and output members in a fluid chamber having a wall, a lockup clutch connecting said input and output members, said chamber having a central exhaust and drain means including a port in said wall at a point radially intermediate said central exhaust and the outer diameter to continuously exhaust fluid at a low volume flow rate from the fluid chamber only when the chamber contains more than a predetermined volume of fluid and retain a predetermined volume of fluid in said chamber to provide a high slip fluid drive, a controlled supply line for supplying fluid to actuate said lockup clutch, a fluid drive supply line to continuously supply fluid at a larger volume flow rate to said fluid chamber though a portion of the fluid passes through said drain means with the excess passing to said exhaust, and control means responsive to a change in condition of said lockup clutch to discontinue the supply of fluid to said fluid chamber to permit said drain means to partially empty said chamber to provide said high slip fluid drive when said lockup clutch is engaged.

9. In a fluid drive having bladed members located in a fluid chamber, said chamber having an uncontrolled drain passage extending from said chamber to exhaust providing during operation of the fluid drive a low volume flow rate exhaust from said chamber when and only when more than a predetermined volume of fluid is in said chamber and preventing exhaust from said central only when less than said predetermined volume of fluid is in said chamber, fluid supply means to supply fluid at a greater rate of fluid flow to said chamber to fill said chamber though a portion of the fluid passes through said drain passage, and control means to disable said fluid supply means to permit said drain passage to partially empty said chamber to provide a high slip fluid drive.

10. The invention defined in claim 9, a lockup clutch connecting said input and output bladed members, means to engage and disengage said lockup clutch and means responsive to engagement of said lockup clutch to actuate said control means to disable said fluid supply means.

11. In a fluid drive having rotatable bladed members located in a fluid chamber, said chamber having an uncontrolled drain passage extending from a point in said chamber intermediate the center and the outer perimeter to exhaust providing during operation of the fluid drive a constant low volume flow rate continuous exhaust from said chamber when and only when more than a predetermined volume of fluid is in said chamber and preventing exhaust from said chamber when less than said predetermined volume of fluid is in said chamber, fluid supply means to supply fluid at a constant greater rate of fluid flow to said chamber to fill said chamber though a portion of the fluid passes through said drain passage, and control means to disable said fluid supply means to permit said drain passage to partially empty said chamber to provide a high slip fluid drive.

12. In a fluid drive, the combination of rotating bladed members located in a fluid chamber, said bladed members having an inner and outer perimeter, a central exhaust located within said inner perimeter of said blades, said chamber having an uncontrolled drain passage extending from a point in said chamber intermediate the inner and outer perimeter of said blades to exhaust providing during operation of the fluid drive a low volume flow rate exhaust from said chamber when and only when more than a predetermined volume of fluid is in said chamber and preventing exhaust from said chamber when less than said predetermined volume of fluid is in said chamber, fluid supply means to supply fluid at a larger rate of fluid flow to said chamber to fill said chamber though a portion of the fluid passes through said drain passage and the excess being exhausted by said central exhaust, and control means to disable said fluid supply means to permit said drain passage to partially empty said chamber to provide a high slip fluid drive.

References Cited in the file of this patent

UNITED STATES PATENTS

| 2,049,673 | Starr | Aug. 4, 1936 |
| 2,151,075 | Berger | Mar. 21, 1939 |
| 2,187,667 | Sinclair et al. | Jan. 16, 1940 |
| 2,289,440 | Kugel | July 14, 1942 |
| 2,397,862 | Jencick | Apr. 2, 1946 |
| 2,521,117 | DuBois et al. | Sept. 5, 1950 |
| 2,645,137 | Roche | July 14, 1953 |
| 2,652,730 | Newcomb | Sept. 22, 1953 |
| 2,689,458 | Weymann | Sept. 21, 1954 |
| 2,761,276 | Kollmann | Sept. 4, 1956 |

FOREIGN PATENTS

| 668,839 | France | June 22, 1922 |